United States Patent [19]

Nishiwaki et al.

[11] Patent Number: 5,517,000
[45] Date of Patent: May 14, 1996

[54] APPARATUS FOR FORMING A WORKPIECE USING PLURAL LIGHT BEAMS

[75] Inventors: Masayuki Nishiwaki, Kawasaki; Jun Koide, Tokyo, both of Japan

[73] Assignee: Canon Kabushiki Kaisha, Tokyo, Japan

[21] Appl. No.: 229,133

[22] Filed: Apr. 18, 1994

Related U.S. Application Data

[60] Continuation of Ser. No. 965,758, Oct. 23, 1992, abandoned, which is a division of Ser. No. 691,515, Apr. 25, 1991, Pat. No. 5,263,250.

[30] Foreign Application Priority Data

Apr. 27, 1990 [JP] Japan ..................... 2-110474

[51] Int. Cl.⁶ .................................. B23K 26/06
[52] U.S. Cl. ........................ 219/121.77; 219/121.75
[58] Field of Search ................ 219/121.7, 121.71, 219/121.72, 121.73, 121.75, 121.77; 359/619, 831

[56] References Cited

U.S. PATENT DOCUMENTS

| | | | |
|---|---|---|---|
| 3,586,816 | 6/1971 | Hagen | 219/121.7 |
| 4,378,480 | 3/1983 | Langhans | 219/121.7 |
| 4,682,885 | 7/1987 | Torigoe | 355/67 |
| 4,683,524 | 7/1987 | Ohta | 362/268 |
| 4,793,694 | 12/1988 | Liu | 219/121.75 |
| 4,851,978 | 7/1989 | Ichihara | 359/619 |
| 4,950,862 | 8/1990 | Kajikawa | 219/121.75 |
| 5,055,653 | 10/1991 | Funami et al. | 219/121.75 |
| 5,153,773 | 10/1992 | Muraki et al. | 359/619 |
| 5,160,965 | 11/1992 | Koide | 355/202 |

FOREIGN PATENT DOCUMENTS

| | | |
|---|---|---|
| 066432 | 12/1982 | European Pat. Off. . |
| 57-181873 | 11/1982 | Japan . |
| 61-23592 | 2/1986 | Japan . |
| 62-2540 | 1/1987 | Japan . |
| 62-115719 | 5/1987 | Japan . |
| 62-115718 | 5/1987 | Japan . |
| 1-313196 | 12/1989 | Japan . |

OTHER PUBLICATIONS

"Prism Deflector for Laser Machining" by Kremen on p. 882 of IBM Technical Disclosure Bulletin, vol. 6, No. 6, Nov. 1965.
"Process for Fabrication of Ink Jet Orifices", Gardner, W., Xerox Tech. Disc. Journal, vol. 4, No. 2, Mar./Apr. 1979.
"Lasers in Industry", Gagliano, Francis P., et al., Proc. IEEE, vol. 57, No. 2, Feb. 1969, pp. 114–117.
"Excimer Laser Material Processing—Methods and Results", Sowada, U. et al., Laser und Optoelektronik, vol. 20, No. 2, Apr. 1988 (W. Ger.).
"Making Multi-Ink Jet Nozzles and Charging Structures from a Single Sheet of Machinable Plastic", Lane, R., et al., IBM Techn. Discl. Bulletin, vol. 17, No. 5, Oct. 1974.

*Primary Examiner*—Geoffrey S. Evans
*Attorney, Agent, or Firm*—Fitzpatrick, Cella, Harper & Scinto

[57] ABSTRACT

A plurality of elongated beams are generated by dividing a laser beam, said plurality of beams being respectively applied to corresponding lens elements of a flyeye lens array. The structure is arranged in such a manner that the diameter of the plurality of the beams in the shorter direction is made smaller than that of each of the lens elements, so that the plurality of beams are further divided into a plurality of elongated secondary beams by the flyeye lens. The plurality of the secondary beams are bundled on a diaphragm in such a manner that their lengthwise directions substantially coincide with each other so that a beam pattern is formed. A row of openings arranged in the lengthwise direction of the beam pattern and formed in the diaphragm member are uniformly and efficiently irradiated with the thus-formed beam pattern. Then, the image of the row of openings is projected onto a plastic plate or the like so that a multiplicity of holes are formed in the plate. As a result, a nozzle plate of an ink jet printer head can be accurately and quickly manufactured.

11 Claims, 3 Drawing Sheets

APPARATUS FOR FORMING A WORKPIECE USING PLURAL LIGHT BEAMS

This application is a continuation of application Ser. No. 07/965,758 filed Oct. 23, 1992, now abandoned, which was a divisional of application Ser. No. 07/691,515 filed Apr. 25, 1991, now U.S. Pat. No. 5,263,250.

BACKGROUND OF THE INVENTION

1. Field of the Present Invention

The present invention relates to a method of manufacturing a nozzle plate for an ink jet printer.

2. Description of the Prior Art

Recently, ink jet printers have attracted attention.

An ink jet printer records an image by discharging ink through nozzles (ink discharging apertures) which are formed in a nozzle plate of a recording head.

As a method of manufacturing such a nozzle plate, there is known an exposure method in which laser beams are used. This method comprises the steps of applying the laser beam to a masking plate which is positioned hermetically in contact with a workpiece to be processed and irradiating the workpiece with the beam which has passed through a row of holes formed in the masking plate, so that a row of holes are formed in the workpiece.

However, the above-described method inefficiently uses the energy of the laser beam because only a small portion of the optical energy of the laser beam applied to the masking plate reaches the workpiece.

SUMMARY OF THE INVENTION

Accordingly, an object of the present invention is to provide an improved method of manufacturing a nozzle plate for an ink jet printer.

In order to achieve the above-described object, an exposure method and apparatus are used in which a lens array is used and a laser beam is applied to the lens array in an improved manner.

In accordance with one aspect of the present invention, a method of manufacturing a nozzle plate for an ink jet printer head, by applying to a plate a plurality of elongated secondary light beams from a flyeye lens including an array of lens elements, comprises the steps of dividing a laser beam to provide a plurality of elongated beams, each having a width smaller than a corresponding lens element, applying the plurality of elongated beams to corresponding lens elements to generate the plurality of elongated secondary light beams, condensing the plurality of secondary beams so they substantially coincide to form an elongated beam pattern for application to a diaphragm member, the length of the beam pattern being arranged in a direction in which openings are arranged in the diaphragm member, and projecting the image of the openings formed by the beam pattern onto the surface of the plate, whereby holes are formed therein to provide nozzles for ink jet printing.

In accordance with another aspect of the invention, a method of exposing a workpiece to light, via an elongated opening or a row of openings formed in a diaphragm member extending in a predetermined direction, comprises the steps of generating a plurality of secondary beams by applying to an array of lens elements a plurality of elongated beams, each having a width smaller than a corresponding lens element; and forming a beam pattern extending in the predetermined direction by condensing the plurality of secondary beams so they substantially coincide for application to the diaphragm member.

In accordance with a further aspect of the invention, an apparatus for exposing a workpiece to light, via an elongated opening or an opening array extending in a predetermined direction, comprises a lens including an array of lens elements, irradiating means for applying plural elongated beams to corresponding lens elements, the width of each elongated beam being smaller than a corresponding lens element, and a condenser lens for forming a beam pattern extending in the predetermined direction by condensing together secondary beams formed by the lens elements from the elongated beams, the secondary beams being condensed so that the lengthwise directions thereof substantially coincide with each other for application to the elongated opening or opening array.

In accordance with a still further aspect of the present invention, a method of manufacturing a nozzle plate for an ink jet printer head, by applying a plurality of secondary beams from a lens array to a diaphragm member having a row of openings formed in a predetermined direction, comprises the steps of generating the plurality of secondary beams by applying a plurality of elongated beams to corresponding lens elements in the lens array, the width of the elongated beams being smaller than corresponding lens elements, and forming a beam pattern extending in the predetermined direction by condensing the secondary beams so that the lengthwise directions thereof substantially coincide with each other for application to the row of openings in the diaphragm member.

In accordance with yet another aspect of the present invention, a method of manufacturing a nozzle plate for an ink jet printer head, by using a member having a row of openings in a predetermined direction, comprises the steps of generating a plurality of elongated laser beams, forming a beam pattern extending in the predetermined direction by condensing the plurality of laser beams so that their lengthwise directions substantially coincide with each other, and exposing the row of openings in the member with the beam pattern to form a plurality of holes in the plate.

In one aspect of the present invention, the laser beam is shaped for the purpose of making its cross sectional shape, after being collimated, the same as the cross sectional shape of a lens array such as the above-described flyeye lens.

The optical system used to shape the laser beam may be a plurality of lenses and at least one of the lenses is an anamorphic lens such as a cylindrical lens.

It is preferable to arrange the optical system, which is used to shape the laser beam, in such a manner that the lenses are capable of enlarging/contracting the diameter of the laser beam for the purpose of making the size (diameter) of the laser beam substantially coincide with the size (diameter) of the lens array such as the flyeye lens.

It is also preferable to arrange the optical system, which is used to shape the laser beam, in such a manner that the plurality of the elongated beams incident upon the flyeye lens are parallel to each other, parallel to the optical axis and in the form of a parallel beam.

Other and further objects, features and advantages of the invention will be appear more fully from the following description.

DESCRIPTION OF THE PREFERRED EMBODIMENTS

Preferred embodiments of the present invention will now be described with reference to the drawings.

Figure 1:
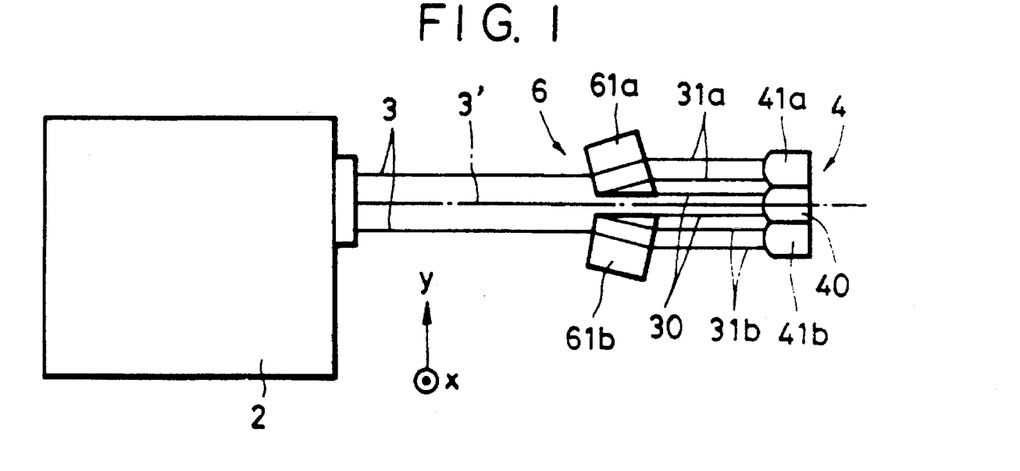
FIG. 1 is a schematic side elevational view of a first embodiment of the claimed invention.

Referring to FIG. 1, reference numeral 2 represents a laser which serves as a light source, for example, an excimer laser such as KrF laser for irradiating laser pulses having an wavelength of 248.4 nm. Reference numeral 3 represents a light beam emitted from the above-described laser 2, and 3' represents an optical axis of the light beam 3. Referring to FIG. 1, two directions extending perpendicularly to each other in a plane disposed perpendicularly to the optical axis are hereinafter called directions x and y as shown in FIG. 1. Other types of beam other than an excimer laser beam can be optionally employed in the apparatus according to the present invention. The laser beam 3 is a parallel beam having a substantially rectangular cross sectional shape the size of which is about 20 to 35 mm in the direction x and about 3 to 10 mm in the direction y.

Figure 4:
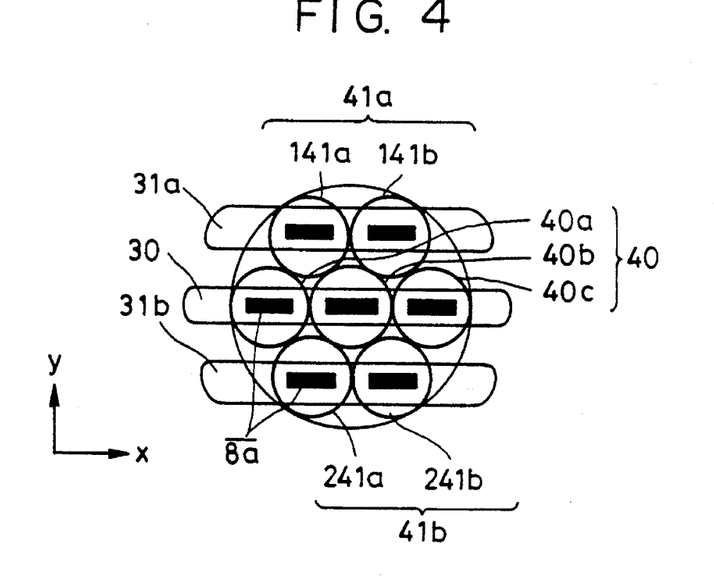
FIG. 4 is a front elevational view of the opening embodiment shown in FIG. 1.

Reference numeral 4 represents a flyeye lens (an optical integrator) serving as an imaging optical element group, and 40, 41a and 41b represent rows of optical or lens elements disposed in the direction x. According to this embodiment, these lens elements are employed as imaging optical elements. Furthermore, the y-directional length of the flyeye lens 4 is longer than the y-directional length of the light beam 3. As shown in FIG. 4, the optical element row 40 is composed of three imaging optical elements 40a, 40b and 40c disposed in the direction x. The optical element row 41b disposed adjacently below the row 40 in the direction y is composed of two imaging optical elements 241a and 241b disposed in the direction x. The optical element row 41a disposed adjacently above the row 40 in the direction y is composed of two imaging optical elements 141a and 141b disposed in the direction x.

Referring to FIG. 1, reference numeral 61a and 61b represent prisms which constitute a beam splitter 6, the prisms 61a and 61b being disposed in the direction y at a predetermined interval. Each of the prisms 61a and 61b receives a portion of the light beam 3 so that the wave front of the light beam 3 is divided. Furthermore, each of the prisms 61a and 61b is arranged in such a manner that its light incidental surface and the light emission surface parallel each other while being inclined with respect to plane x-y.

A portion of the light beam 3 passes through a gap present between the above-described prisms 61a and 61b. Then, it is, as shown in FIGS. 1 and 4, made incident upon the central portion of the above-described optical element row 40 in the direction y, the portion of the light beam 3 being in the form of a first elongated (linear) light beam 30 extending in the direction x before it is made incident as described above. As a result, the wave front of the portion of the light beam 3 is divided so as to be a plurality of light beams. A portion of the light beam 3 is, by the prism 61b, parallel-translated in the direction y by a proper distance. As a result, it is, as shown in FIGS. 1 and 4, made incident upon the central portion of the optical element row 41b in the direction y, this portion of the light beam 3 being in the form of a parallel beam before it is made incident as described above. Similarly, a portion of the light beam 3 is, by the prism 61a, parallel-translated in the direction y by a proper distance. As a result, it is, as shown in FIGS. 1 and 4, made incident upon the central portion of the optical element row 41a in the direction y, this portion of the light beam 3 being in the form of a parallel beam before it is made incident as described above. As a result, the wave front of the portion of the light beam 3 is divided so as to be a plurality of elongated light beams. The first, second and the third elongated light beams have the same width in the direction y, the width being arranged to be smaller than the diameter of each of the imaging optical elements. The distance of the parallel translation due to the action of each of the prisms 61a and 61b can be determined properly in accordance with the index of refraction, the thickness and the incidental angle of the beam upon the prism.

Figure 2:
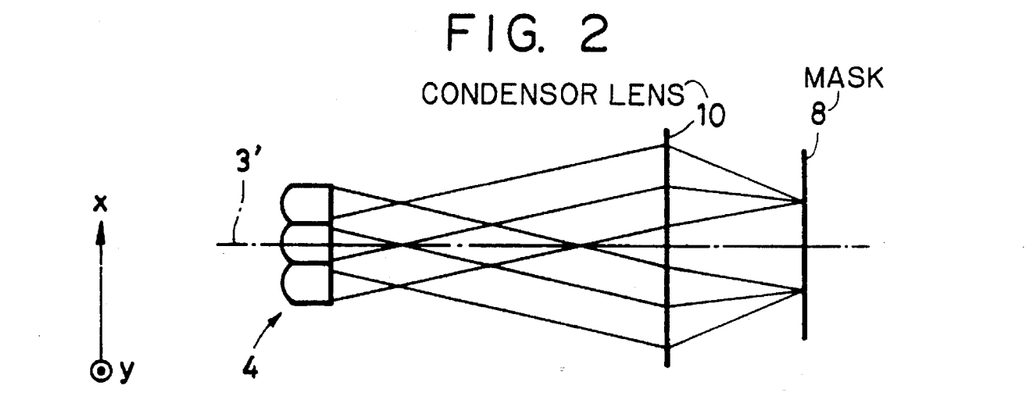
FIG. 2 is a side elevational view of an optical system prior to and including a mask which is used in the embodiment depicted in FIG. 1.
Figure 5:
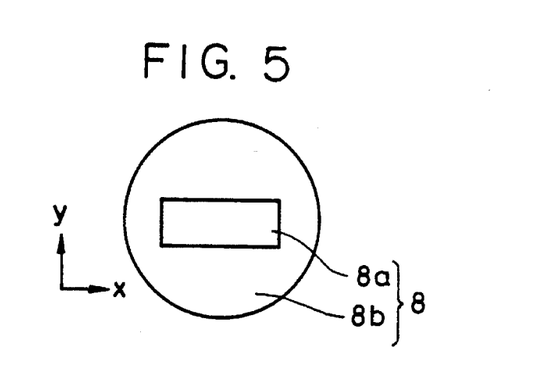
FIG. 5 is a front elevational view of the opening pattern of the mask used in the embodiment shown in FIG. 1.

FIG. 2 illustrates the optical system disposed subsequent to the above-described flyeye lens 4, where reference numeral 8 represents a mask disposed perpendicular to the optical axis 3'. As shown in FIG. 5, the mask 8 is a diaphragm member composed of a light transmissible portion 8a and a light shielding portion 8b in a predetermined pattern. The light transmissible portion 8a is in the form of an elongated opening extending in the direction x, the opening being formed to correspond to a transparent substrate of the mask 8. The light shielding portion 8b is formed by a metal film such as a chrome film patterned on the above-described transparent substrate.

Referring to FIG. 2, reference numeral 10 represents a condenser lens. Thus, light beams emitted from the lenses of the flyeye lens 4 are temporarily converged by the action of each of the imaging optical elements so that a multiplicity of elongated secondary light beams or sources are formed in a plane perpendicular to the optical axis 3'. Secondary beams emitted from the thus-formed secondary light sources pass through the condenser lens 10 before they are made incident upon the above-described mask 8 while being bundled together. The total number of secondary light sources coincides with the number of the imaging optical elements which constitute the flyeye lens 4.

The condenser lens 10 is disposed in such a manner that its focal point on the light emitting side coincides with the surface of the pattern of the mask 8. As a result, the secondary beams emitted from the multiplicity of secondary light sources can be made correctly condensed and superimposed on the mask 8. Furthermore, the shape of the light spot formed by the above-described light beams on the mask 8 becomes elongated. The lengthwise direction of the light spot and the lengthwise direction of the light transmissible portion 8a of the mask 8 are made to coincide with each other.

Figure 3:
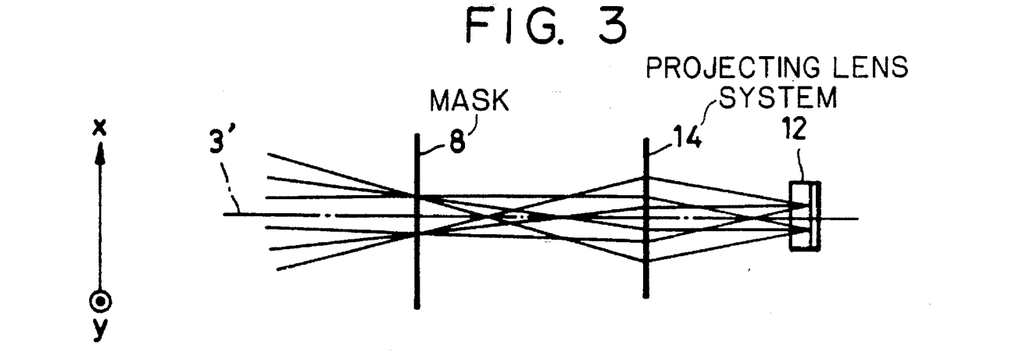
FIG. 3 is a side elevational view of the optical system including and subsequent to the mask which is used in the embodiment depicted in FIG. 1.
Figure 8:
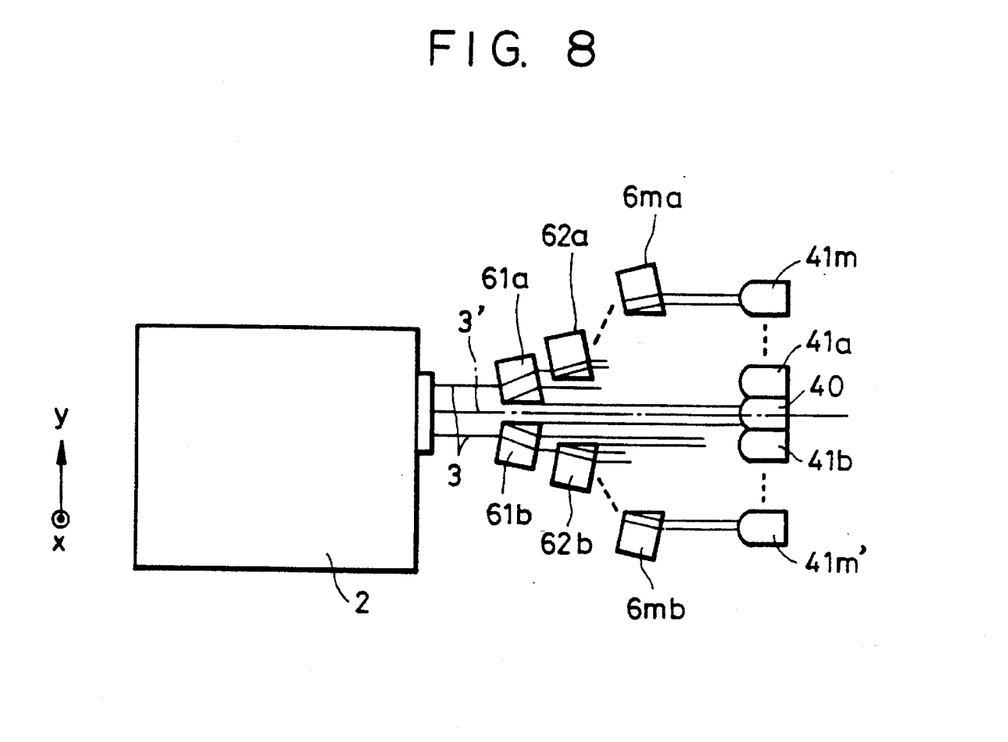
FIG. 8 is a schematic side elevational view illustrating a third embodiment obtained by modifying the first embodiment.

FIG. 3 illustrates the optical system disposed subsequent to the above-described mask 8. Referring to FIG. 8, reference numeral 14 represents a projecting lens system disposed between the mask 8 and a member 12 to be processed. The projecting lens system 14 causes the image of the opening pattern (the light transmissible portion 8a) of the mask 8 to be projected on the surface of the member 12 to be processed. As a result, a substantially elongated hole, the shape of which is in accordance with the shape of the image of the opening pattern of the mask 8, is formed in the member 12 to be processed by the optical energy of the laser beam.

According to this embodiment, the opening pattern of the mask 8 is, as shown in FIG. 5, arranged in such a manner that the light transmissible portion 8a is present in only the central portion in the direction y, the light transmissible portion 8a having a considerably small area with respect to the overall area (that is, the sum of the area of the light transmissible portion 8a and that of the light shielding portion 8b) of the mask 8. The regions of the imaging optical elements that respectively optically correspond to the light transmissible portion $\overline{8a}$ of the mask 8 are designated by symbol 8a of FIG. 4.

As described above, according to this embodiment, the three elongated light beams 30, 31a and 31b are formed into a shape which is substantially similar to the shape of the light transmissible portion 8a of the mask 8. Furthermore, the above-described elongated light beams are applied to the corresponding rows of imaging optical elements 40, 41a and 41b. Consequently, the density of the optical energy of the light beams to be made incident upon the light transmissible portion 8a of the mask 8 can be greatly increased. In addition, the light transmissible portion 8a can be irradiated at the same illumination intensity. Therefore, nozzle plates can be quickly, efficiently and accurately manufactured. Furthermore, manufacturing speed and efficiency can be realized with a reduced laser output, reducing overall cost. In addition, materials which require more energy for processing can be manufactured.

As an alternative to the disclosed structure, different structure may be employed in which parallel elongated beams are individually applied to the imaging optical elements (lenses) which constitute the flyeye lens.

Figure 6:
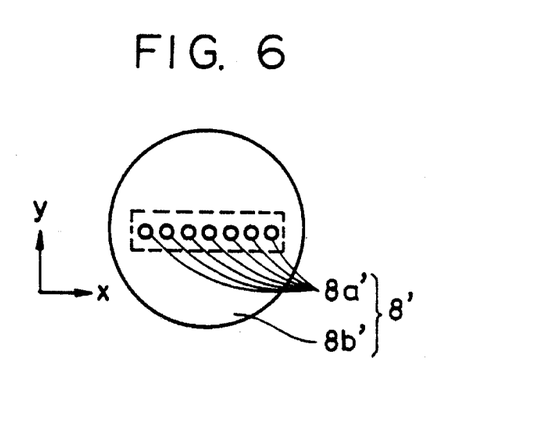
FIG. 6 is a schematic view illustrating a mask pattern for manufacturing nozzle plates for ink jet printer recording heads.

FIG. 6 is a schematic view which illustrates a mask pattern for manufacturing the nozzle plate of a recording head of an ink jet printer.

The above-described mask 8 shown in FIG. 5 is arranged to have the elongated opening to serve as the light transmissible portion 8a. Referring to FIG. 6, a plurality of small circular openings 8a' are linearly disposed to confront the nozzles of the nozzle plate, the plurality of the small circular openings 8a being formed in an elongated region on the mask corresponding to the portion 8a, designated in FIG. 6 by a dashed line. Also in this case, the lengthwise direction of the beam spots on the mask 8 coincides with the direction of the configuration of the small circular openings 8a'. By preparing a plastic plate as the workpiece and using the thus-arranged mask, a plurality of holes are simultaneously formed in the plastic plate so that a plurality of nozzles can be formed.

According to the present invention, the mask 8 may be varied optionally. For example, a mask in which the light transmissible pattern is formed by forming a hole in a metal plate may be employed.

Furthermore, the desired processing may be performed while bringing the mask 8 into contact with the member to be processed.

Figure 7:
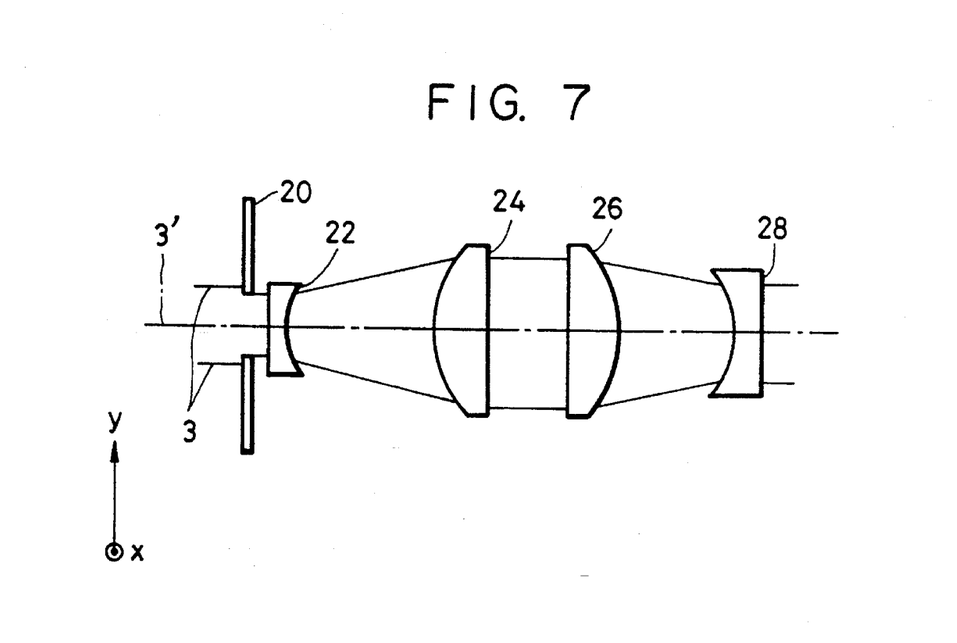
FIG. 7 is a schematic side elevational view of a second embodiment obtained by modifying the first embodiment.

FIG. 7 is a schematic view which illustrates a second embodiment of the invention which is obtained by a first modification to the first embodiment.

Referring to FIG. 7, reference numeral 20 represents an elliptical mask, 22 represents a concave cylindrical lens, 24 represents a convex cylindrical lens, 26 represents a convex spherical lens and 28 represents a concave spherical lens. These elements are disposed in the above-described sequential order between the laser 2 and the above-described prisms 61a and 61b shown in FIG. 1. The elliptical mask 20, the concave cylindrical lens 22 and the convex cylindrical lens 24 are optical elements which constitute a shaping means for shaping the light beam 3 to correspond to the overall shape (that is, a circular shape) of the flyeye lens 4. The convex spherical lens 26 and the concave spherical lens 28 are optical elements which constitute an enlarging/contracting means for enlarging/contracting the light beam made incident upon the flyeye lens 4 to correspond to the overall size of this flyeye lens 4.

FIG. 8 is a schematic view which illustrates a third embodiment of the invention which is obtained by a second modification to the above-described first embodiment. Referring to FIG. 8, the same elements as those shown in FIG. 1 are given the same reference numerals.

According to this embodiment, (2n+1) optical element rows, each of which is constituted by arranging a plurality of the imaging optical elements in the direction x, are disposed in the direction y, where n is a positive integer. The structure in which n=1 corresponds to the above-described first embodiment.

As shown in FIG. 8, $2n$ prisms, such as the prisms 61a and 61b, are provided. By properly disposing the prisms, at least portions of the parallel beams which have respectively passed through the prisms 61a ... 6ma and 61b ... and 6mb can be made incident upon the central portions of the optical element rows 41a ... 41m and 4b ... 41m' of the flyeye lens.

In a case where an even number (2n) of the optical elements are disposed in the direction x, the light beam is sectioned into two sections by using a half mirror or the like. Either of the two sections of the light beam is made incident upon the prism 61a, while the other section of the same is made incident upon the prism 61b so that the light beam is divided similarly.

Although the prism is used as a beam splitter according to the above-described embodiment, the prism may be replaced by a mirror to similarly perform the beam splitting operation. As an alternative to this, a structure in which prisms and mirrors are combined may be employed.

According to the above-described embodiment, the beam splitting operation is performed in only the direction y, but the beams which are divided into the direction y may also be further divided in the direction x. As a result, photoenergy availability can further be improved. The above-described structure is significantly advantageous when it is adapted to a structure in which imaging optical elements which constitute an optical integrator are arranged to form an x-y matrix.

As described above, according to the embodiments of the present invention, a plurality of elongated light beams extending in a first direction are formed by using light irradiating means. The plurality of elongated light beams are respectively applied to a plurality of imaging optical element rows disposed in the first direction. As a result, optical energy can be efficiently used and a mask can be irradiated with the same illumination intensity. Furthermore, the energy density of the light beams which have passed through the mask can be raised. Consequently, the time taken to process a workpiece such as the nozzle plate can be shortened and working efficiency and accuracy can be improved.

Therefore, the manufacturing cost for such plates can be reduced and materials which require large energy can be processed. As a result, ink jet printers can be efficiently manufactured in such a manner that the nozzle plates thus-manufactured are mounted on the recording heads. The nozzles may be formed by applying the light beams to the nozzle plate after the plate has been fastened to the recording head.

Although the invention has been described in its preferred form with a certain degree of particularly, it is understood that the present disclosure of the preferred form may be changed in the details of construction and alternations in the combination and arrangement of parts may be resorted to without departing from the spirit and the scope of the invention as hereinafter claimed.

What is claimed is:

1. An apparatus for exposing a workpiece to light via an elongated opening or an opening array extending in a predetermined direction within a mask, the apparatus comprising:

a lens including an array of lens elements, each said lens element having a diameter;

irradiating means for applying plural elongated beams to corresponding said lens elements, which form secondary beams therefrom, the width of each elongated beam being smaller than the diameter of said corresponding lens element; and forming means for forming a beam pattern, which extends in said predetermined direction along the elongated opening or the opening array, by superimposing the secondary beams formed by said lens element upon the elongated opening or the opening array, the secondary beams being superimposed so that the directions of elongation of the secondary beams substantially coincide with each other.

2. An apparatus according to claim 1, wherein said irradiating means comprises an excimer laser for emitting laser beams.

3. An apparatus according to claim 1 further comprising a projecting lens system for projecting on the workpiece the image of the elongated opening or array of opening formed by the condensed secondary beams.

4. An apparatus for exposing a workpiece to light via an elongated opening or an opening array extending in a predetermined direction within a mask, said apparatus comprising:

a laser;

a lens comprising an array of lens elements, each said lens element having a diameter;

beam forming means for forming a plurality of elongated beams with light from said laser and for applying said plurality of elongated beams to corresponding said lens elements, which form secondary beams therefrom, a width of each said elongated beam being smaller than the diameter of said corresponding lens elements; and beam pattern forming means for forming a beam pattern, which extends in said predetermined direction along the one of the elongated opening or the opening array, by superimposing the secondary beams formed by said lens elements upon the one of the elongated opening and the opening array, the secondary beams being superimposed so that said secondary beams have a direction of elongation which is substantially coincident.

5. An exposure apparatus comprising:

a laser;

a lens comprising an array of lens elements, each said lens element having a diameter;

beam forming means for forming a plurality of elongated beams with light from said laser and for directing said plurality of elongated beams to corresponding said lens elements of said lens, which form elongated secondary beams therefrom, a width of each said elongated beam being smaller than the diameter of said corresponding lens element; and superimposing means for superimposing said secondary beams upon a plane so that said secondary beams have a direction of elongation which are substantially coincident.

6. An exposure apparatus comprising:

an array of optical elements, each said optical element having a diameter;

beam directing means for directing a plurality of beams to corresponding said optical elements of said array, which form elongated secondary beams therefrom, a width of each elongated beam being smaller than the diameter of said corresponding optical element; and superimposing means for superimposing said secondary beams upon a plane so that said secondary beams have a direction of elongation which are substantially coincident.

7. An exposure apparatus according to claim 6, wherein said beam directing means comprises:

a laser; and beam splitting means for splitting a laser beam from said laser into said plural elongated beams.

8. An exposure apparatus according to claim 7, wherein said beam splitting means comprises a plurality of prisms.

9. An exposure apparatus according to claim 7, wherein said laser is an excimer laser.

10. An exposure apparatus according to claim 6, wherein each of said optical elements comprises a focusing element.

11. An exposure apparatus according to claim 10, wherein each of said focusing elements comprises a lens element.

* * * * *

UNITED STATES PATENT AND TRADEMARK OFFICE
CERTIFICATE OF CORRECTION

PATENT NO. : 5,517,000
DATED : May 14, 1996
INVENTOR(S) : MASAYUKI NISHIWAKI, ET AL.       Page 1 of 3

It is certified that error appears in the above-indentified patent and that said Letters Patent is hereby corrected as shown below:

<u>IN THE DRAWINGS</u>

<u>SHEET 1</u>

Figure 2, "CONDENSOR" should read --CONDENSER--.

<u>COLUMN 1</u>

Line 10, "Present" should be deleted.

<u>COLUMN 2</u>

Line 42, "cross sectional" should read --cross-sectional--; and     Line 43, "cross sectional" should read --cross-sectional--.

<u>COLUMN 3</u>

Line 29, "an" should read --a--;

Line 39, "cross sectional" should read --cross-sectional--; and     Line 59, "numeral 61a" should read --numerals 61a--.

UNITED STATES PATENT AND TRADEMARK OFFICE
CERTIFICATE OF CORRECTION

PATENT NO. : 5,517,000
DATED : May 14, 1996
INVENTOR(S) : MASAYUKI NISHIWAKI, ET AL.

It is certified that error appears in the above-indentified patent and that said Letters Patent is hereby corrected as shown below:

COLUMN 5

Line 19, "portion 8a" should read --portion $\overline{8a}$--;

Line 20, "symbol 8a" should read --symbol $\overline{8a}$--; and

Line 36, "different" should read --a different.

Line 48, "openings 8a" should read --openings 8a'--.

COLUMN 6

Line 31, "61b...and 6mb" should read --61b...6mb--.
sectional--; and

COLUMN 7

Line 10, "particularly," should read --particularity,--;

Line 31, "element" should read --elements--; and

Line 41, "array of opening" should read --opening array--.

UNITED STATES PATENT AND TRADEMARK OFFICE
CERTIFICATE OF CORRECTION

PATENT NO. : 5,517,000
DATED : May 14, 1996
INVENTOR(S) : MASAYUKI NISHIWAKI, ET AL.

It is certified that error appears in the above-indentified patent and that said Letters Patent is hereby corrected as shown below:

<u>COLUMN 8</u>

Line 2, "elements;" should read --element;--.

Signed and Sealed this

First Day of October, 1996

Attest:

BRUCE LEHMAN

*Attesting Officer*  *Commissioner of Patents and Trademarks*